No. 786,085. Patented March 28, 1905.

UNITED STATES PATENT OFFICE.

OSCAR BALLY, OF MANNHEIM, GERMANY, ASSIGNOR TO BADISCHE ANILIN & SODA FABRIK, OF LUDWIGSHAFEN-ON-THE-RHINE, GERMANY, A CORPORATION OF BADEN.

VIOLET ANTHRACENE DYE AND PROCESS OF MAKING SAME.

SPECIFICATION forming part of Letters Patent No. 786,085, dated March 28, 1905.

Application filed November 17, 1904. Serial No. 233,161.

*To all whom it may concern:*

Be it known that I, OSCAR BALLY, doctor of philosophy and chemist, a citizen of the Swiss Republic, residing at Mannheim, in the Grand Duchy of Baden, German Empire, have invented new and useful Improvements in Anthracene Coloring-Matters and Processes of Producing the Same, of which the following is a specification.

This invention relates to the production of new products which are of use for the preparation of new coloring-matters.

It is well known that beta-amido-alizarin can be condensed with glycerin in the presence of sulfuric acid, yielding the chinolin of alizarin. I have now discovered that beta-amido-anthrachinon when treated in the same manner does not yield the corresponding anthrachinolinchinon described by Graebe, (*Annalen* 201, page 349;) but the condensation proceeds further, so that one molecular proportion of the beta-amido-anthrachinon condenses with two molecular proportions of glycerin, yielding new compounds. Instead of beta-amido-anthrachinon itself other amido-anthrachinons which contain an amido group in the beta position and also sulfo-acids of the beta-amido-anthrachinons may be employed, and I use the term "beta-amido-anthrachinon" body to include both the beta-amido-anthrachinons and their sulfo-acids. The condensation may further take place with or without the addition of nitrobenzene or other body which exerts a similar influence on the reaction. The product of condensation of beta-amido-anthrachinon and glycerin is not homogeneous, but consists of two or more very similar compounds, which are of a basic nature and are obtained on pouring the reaction mixture into water in the form of a yellow flocculent precipitate. When dry the condensation product presents an olive-yellow powder which is insoluble in water, partially soluble in hot alcohol, benzene, and glacial acetic acid and soluble in concentrated sulfuric acid, yielding a reddish-brown solution with a strong green fluorescence. It is also soluble in concentrated hydrochloric acid, giving a yellow solution, from which it is precipitated again by the addition of water. The condensation products obtainable from 2.6 and 2.7 diamido-anthrachinons are dark-brown powders, which otherwise possess properties similar to those given above. When the sulfo-acids of these beta-amido-anthrachinons are condensed with glycerin, the products obtained also consist of olive-yellow to dark-brown powders, which in concentrated sulfuric acid yield reddish-brown solutions with a strong green fluorescence, and which also dissolve in concentrated hydrochloric acid with a yellow color and are precipitated from this solution by the addition of water. Owing probably to the presence of the sulfo group, they are slightly soluble in cold water and more easily soluble in hot water. All of these condensation products, both from the beta-amido-anthrachinons and also from the sulfo-acids of the same, on being melted with caustic alkali give violet coloring-matters which possess properties similar to those of indanthrene.

The following example, showing how to prepare the condensation product from beta-amido-anthrachinon, will further help to illustrate my invention; but I do not limit my invention to this example. The parts are by weight. Dissolve eighteen (18) parts of beta-amido-anthrachinon in two hundred and forty (240) parts of sulfuric acid (containing about ninety-six (96) per cent. of $H_2SO_4$) and add while stirring thirty-eight (38) parts of ice and then sixteen (16) parts of glycerin. Heat the whole at a temperature of about one hundred and fifty-five degrees centigrade, (155° C.,) whereupon reaction sets in and the mass turns yellow. As soon as the reaction is ended the melt is allowed to cool and is then poured into a mixture of ice and water, and the condensation product, which separates out in the form of yellow flakes, is filtered off and washed and dried.

Now what I claim is—

1. The hereinbefore-described process for the production of anthracene compounds by condensing a beta-amido-anthrachinon body with glycerin in the presence of sulfuric acid.

2. The hereinbefore-described process for the production of anthracene compounds by condensing beta-amido-anthrachinon with glycerin in the presence of sulfuric acid.

3. The anthracene compounds obtainable by condensing a beta-amido-anthrachinon body with glycerin in the presence of sulfuric acid, which compounds, when dry, are soluble in concentrated sulfuric acid yielding fluorescent solutions, and which on melting with caustic alkali yield coloring-matters possessing properties similar to those of indanthrene.

4. The anthracene compound obtainable by condensing beta-amido-anthrachinon with glycerin in the presence of sulfuric acid, which compound, when dry, is an olive-yellow powder, which is soluble in concentrated sulfuric acid yielding a reddish-brown solution with a green fluorescence, which is soluble in concentrated hydrochloric acid yielding a yellow solution, and which on melting with caustic alkali yields a violet coloring-matter possessing properties similar to those of indanthrene.

In testimony whereof I have hereunto set my hand in the presence of two subscribing witnesses.

OSCAR BALLY.

Witnesses:
J. ALEC. LLOYD,
JOS. H. SEUTÉ.